Aug. 12, 1958  R. B. VANCE  2,846,788
AUTOMATIC EJECTOR STOP FOR EARTH-MOVING SCRAPERS
Filed Sept. 10, 1954  3 Sheets-Sheet 1
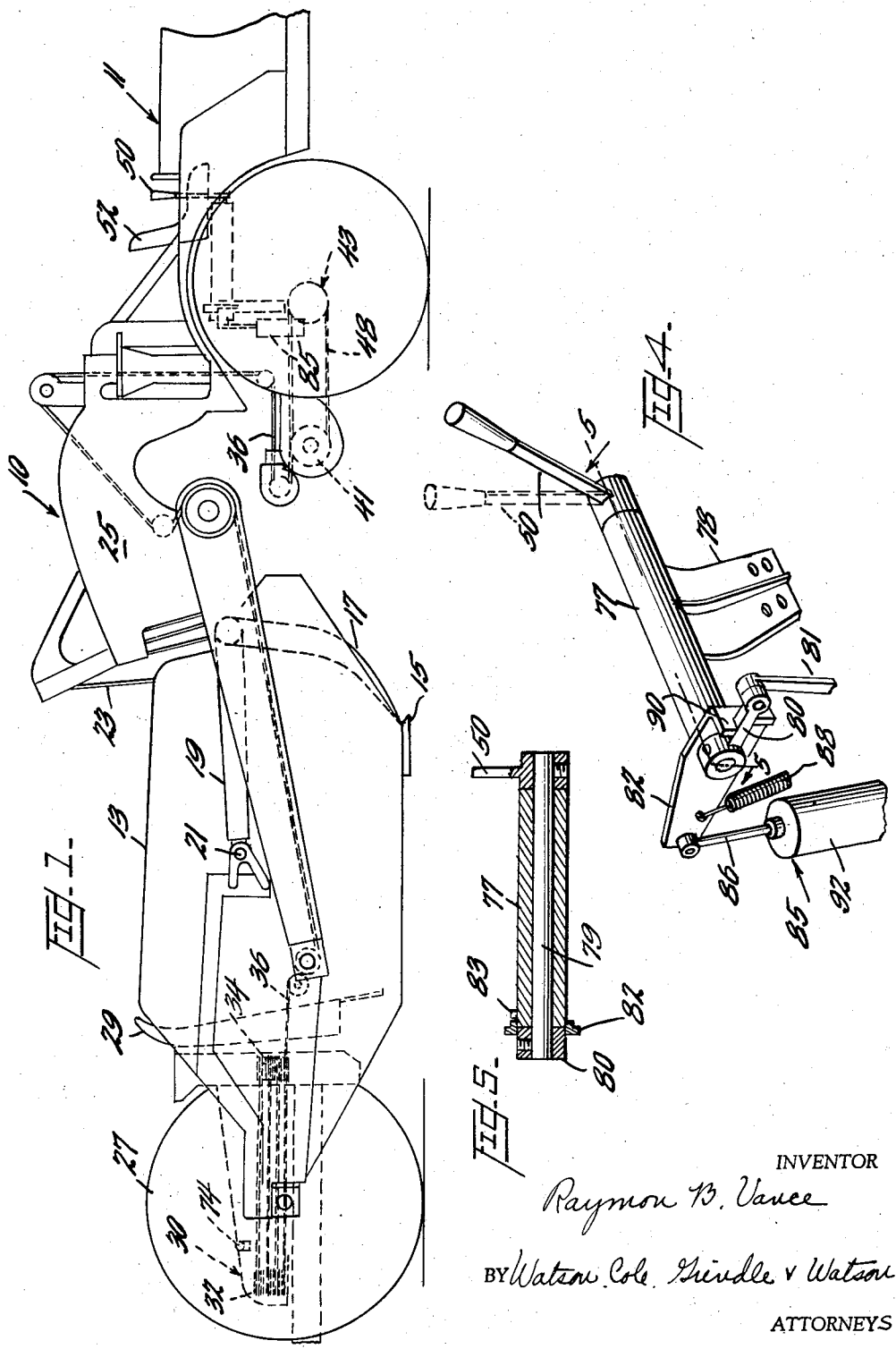
INVENTOR
Raymon B. Vance
BY Watson, Cole, Grindle & Watson
ATTORNEYS

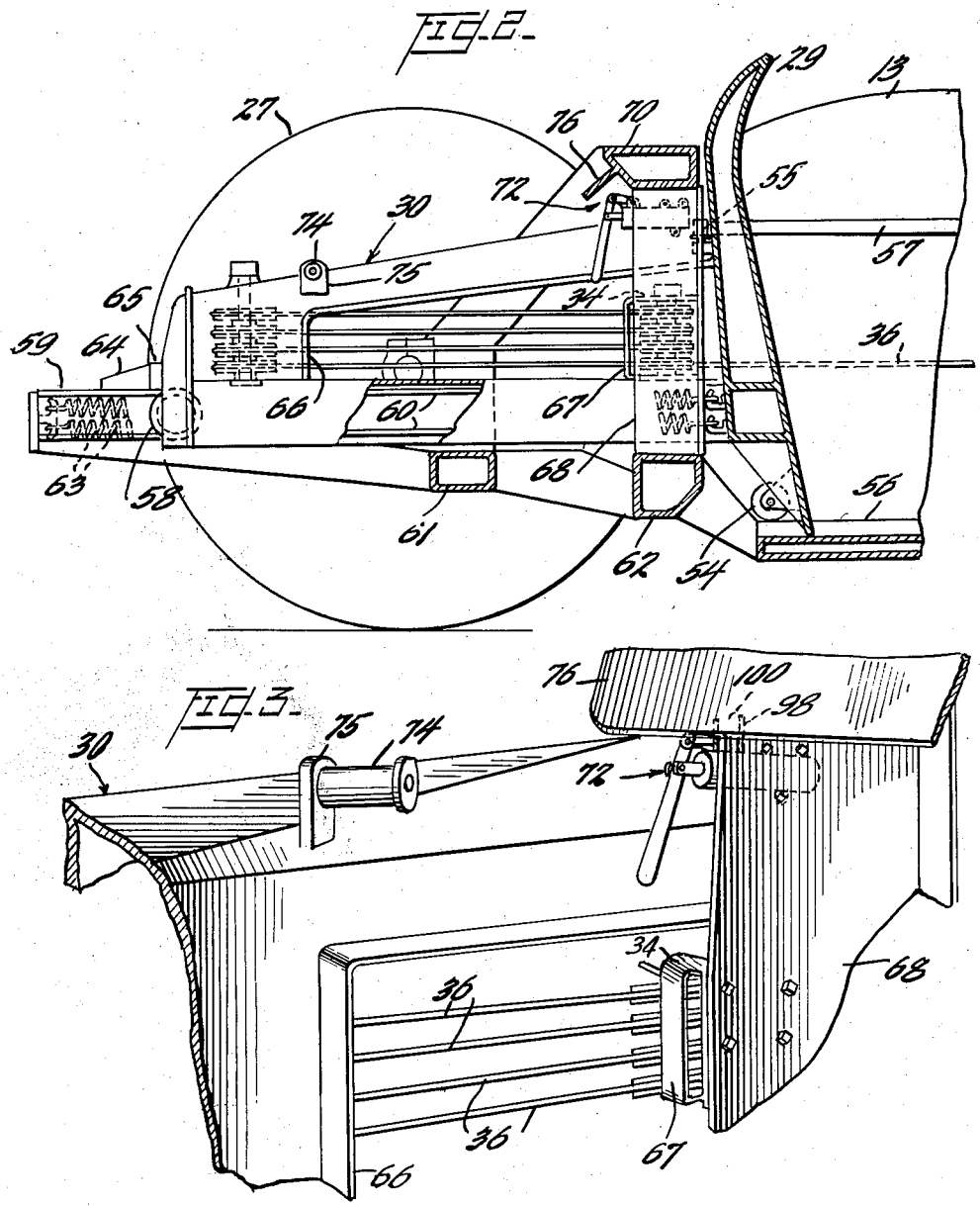

Aug. 12, 1958 R. B. VANCE 2,846,788
AUTOMATIC EJECTOR STOP FOR EARTH-MOVING SCRAPERS
Filed Sept. 10, 1954 3 Sheets-Sheet 3
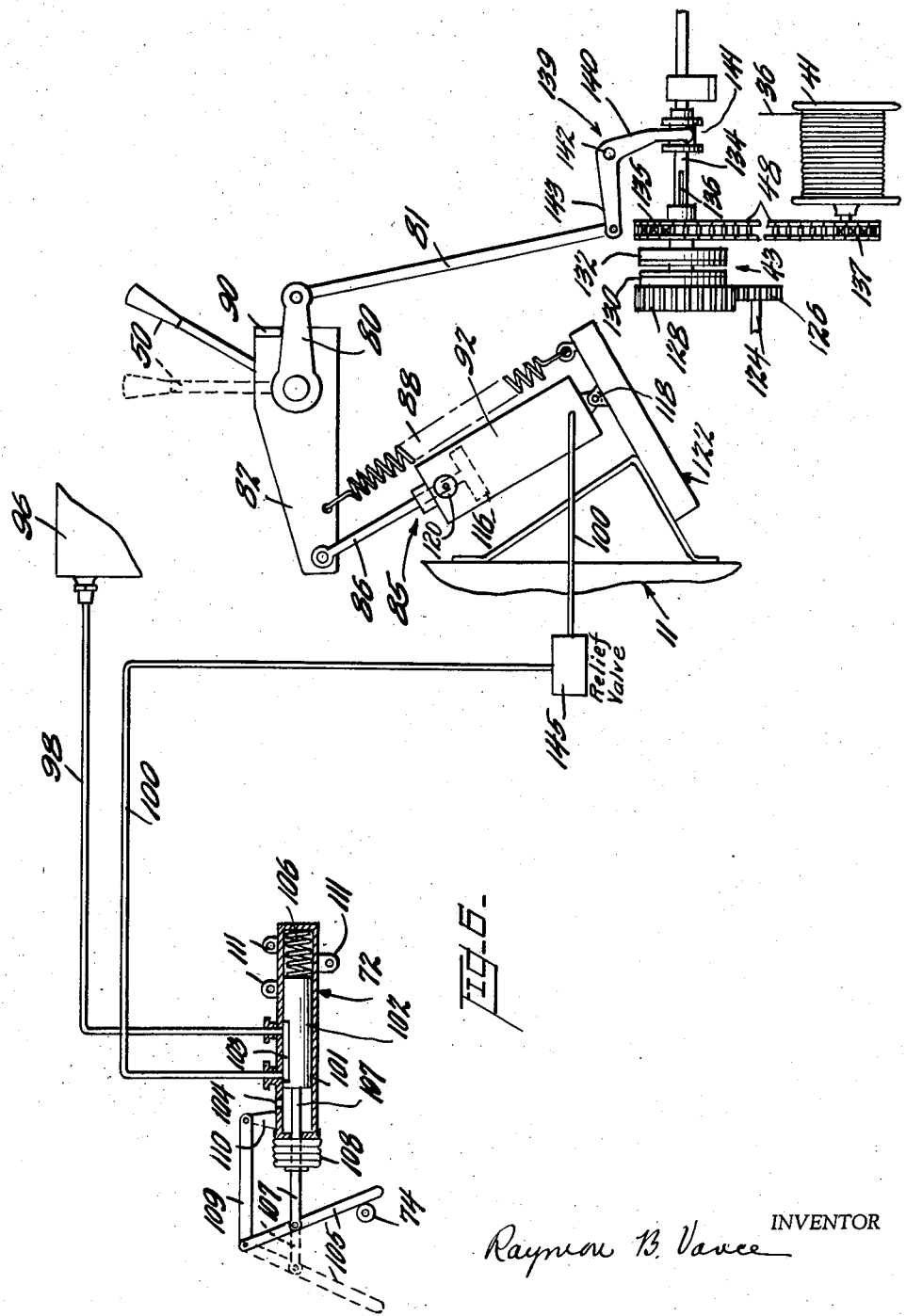
INVENTOR
Raymond B. Vance
BY Watson, Cole, Grindle & Watson
ATTORNEYS United States Patent Office 2,846,788
Patented Aug. 12, 1958

2,846,788
AUTOMATIC EJECTOR STOP FOR EARTH-MOVING SCRAPERS

Raymon B. Vance, Nashville, Tenn.

Application September 10, 1954, Serial No. 455,307

3 Claims. (Cl. 37—126)

This invention relates to control means for automatically stopping the ejector of a carry-type scraper at a desired limit of travel and more particularly to a fluid pressure system for automatically disengaging the ejector clutch.

Conventionally, a carry-type scraper essentially comprises a body member or bowl having a scraper blade near its forward end, a movable gate or apron for closing its forward end, a draft connection for attaching the scraper to a tractor unit, and a movable member referred to as an ejector for closing the rearward end of the bowl and forcing loaded earth out of the scraper. The apron and ejector are normally manipulated by a system of pulleys and cables operated by a power take-off of the tractor unit.

This invention is particularly concerned with the operation of the ejector on a scraper of the type in which the ejector is moved forwardly by reeling in a cable threaded through a pulley unit secured to the bowl and another pulley unit secured to the ejector. In such a system, the forward or ejection movement of the ejector is controlled by the operator who engages a clutch which connects the tractor engine to a drum for the ejector cable, thus reeling in the cable and drawing the pulley units together. Mutually engageable stops are provided on the bowl and ejector, respectively, so that the operator will not be able to move the ejector so far forward that it will run off of its guiding tracks or otherwise damage the machine.

As will be readily understood by anyone familiar with the above type of scraper, the operator often has many controls requiring simultaneous attention. In addition, the operator is located a substantial distance away from the ejector and substantially in line with its movement rather than to the side of such line of movement. As a result, it frequently happens that the operator is either distracted by other controls needing attention or is unable to judge accurately the position of the ejector so that he does not disengage the clutch soon enough and the stops are brought forcibly together and the cable is snapped by excessive strain thus placed upon it.

The main object then of this invention is to provide means which at the desired maximum limit of ejector travel will automatically discontinue the application of the power which drives the ejector forward, thus leaving the operator free to concentrate on other maneuvers required during a spreading run and eliminating the frequent cable breakages which occur on scrapers not equipped with the present invention.

A preferred embodiment of the present invention comprises a cylinder and piston unit operable by the introduction of fluid under pressure into the cylinder to disengage the clutch connected between the power source and the drum for the ejector cable. The passage of fluid into the cylinder is controlled by a valve secured to the scraper bowl and actuated by an abutment positioned to move with the ejector. The valve and its actuating abutment are so located that the abutment moves the valve to open position connecting the fluid pressure source to the cylinder and thus disengaging the clutch when the ejector has moved to substantially the desired limit of forward travel and before the stops are brought into contact. The cylinder and piston unit has a one-way connection with the usual manual clutch control linkage, and means including said connection are provided for freeing the manual clutch control from the automatic control system after the automatic system has operated to disengage the clutch, so that the operator will have unrestricted control of the clutch until the automatic control is again activated.

Accordingly, a further object of this invention is to provide an automatic control for the clutch which operates the ejector or other moving part of an earth working machine. An additional object is to provide a fluid operated control system for disengaging the ejector clutch of a scraper. Another object is to provide a valve controlled cylinder and piston unit for disengaging the ejector clutch when the ejector reaches a predetermined position of forward travel. A further object is to provide an automatic clutch control which is operative only when necessary and at all other times leaves the clutch free for manual operation.

Other and further objects, features, and advantages will be apparent from the description which follows read in connection with the accompanying drawings in which:

Fig. 1 is a side elevational view of a scraper and tractor unit embodying the ejector stop mechanism of this invention;

Fig. 2 is an enlarged sectional view of the rear portion of the scraper shown in Fig. 1, and taken substantially along the longitudinal axis of the scraper.

Fig. 3 is a partial perspective view from the right rear of Fig. 2;

Fig. 4 is a perspective view of the portion of the control mechanism of this invention which is located on the tractor;

Fig. 5 is a sectional view on line 5—5 of Fig. 4; and

Fig. 6 is a diagrammatic view showing the details and interrelation between the various parts of the ejector stop mechanism of this invention.

Referring particularly to Fig. 1, the scraper is indicated generally at 10 and the tractor is indicated generally at 11. The scraper essentially comprises a body member or bowl 13 having a generally U-shaped cross section and a scraper blade 15 near its forward end. The forward end of the bowl has a closure member or apron 17 secured to a lever arm 19 which is pivoted at 21. The apron 17 is normally raised and lowered to open and close the forward end of the of the bowl by means of a cable such as indicated at 23. The control system for the apron 17 has not been shown in detail since it is conventional and forms no part of this invention. The scraper is supported at its forward end by the drag link 25 which is attached to the tractor 11 and at its rearward end by a pair of wheels, one of which is shown at 27.

The rearward end of the bowl 13 is closed by a movable part or ejector 29 having an extension indicated at 30 which carries a pulley unit 32. The pulley unit 32 cooperates with a second pulley unit 34 which is fixed relative to the bowl 13. A cable 36 has one end secured to the pulley unit 34 and is threaded around the pulley units 32 and 34 and carried forward over appropriate guide pulleys to the cable drum 41 on the tractor 11. The drum 41 is operated by the tractor engine through a clutch indicated generally at 43. Clutch 43 is drivingly connected to the drum 41 by means of the sprocket chain indicated at 48, as will be described in more detail with reference to Fig. 6. The clutch is controlled by means of a lever 50 manipulated by the operator who sits in the seat 52.

Referring now to Fig. 2, the ejector mechanism will be described in more detail. The ejector 29, including its rearward extension 30, is supported at its forward end by the rollers 54 and 55 running respectively on tracks 56 and 57 mounted in the bowl 13, and at its rearward end by a pair of rollers 58 running on opposite sides of a track member 59, having the upper and lower track forming flanges 60. The track member 59 is supported by a pair of transverse members 61 and 62 extending between the opposite sides of the rearward extension of body member or bowl 13. A plurality of springs 63 are positioned within the track member 59 and are secured at their rearward ends to the track and at their forward ends to the ejector 29. A rear stop 64 is secured to the track member 59 for engagement with a cooperating stop 65 attached to the ejector extension 30. The extension 30 carries a flange-like lip forming a forward stop 66 positioned in line for engagement with a cooperating stop 67 formed as part of the pulley unit 34. Unit 34 is mounted bewteen a pair of vertical members 68 which are secured at their lower ends to the transverse member 62 and at their upper ends to an additional transverse member 70.

Figs. 2 and 3 show the ejector in its extreme rearward position and it will be understood that when the operator engages clutch 43, the cable 36 will be wound around drum 41, and the pulley units 32 and 34 will be drawn together thus forcing the ejector 29 forward. When the clutch is disengaged, the ejector will be returned by the force of springs 63. It will be seen that during forward movement of the ejector, if the clutch is not disengaged at the proper time, stops 66 and 67 will abut, and continued reeling in of the cable 36 by the drum 41 will result in snapping of the cable.

The structure thus far described in connection with Figs. 1-3 is conventional scraper construction which is modified by the addition of a fluid pressure clutch control system to accomplish the purposes of this invention. The elements of the fluid pressure system which are shown in Figs. 2 and 3 comprise a valve or control unit indicated generally at 72 which is attached to one of the uprights 68 in line for operation by a valve actuating unit or roller abutment 74 secured to the ejector extension 30 by means of a bracket 75. A guard plate 76 is secured to member 70 above valve 72 to prevent dirt from falling on the valve.

The mounting for the conventional clutch lever 50 is shown best in Figs. 4 and 5 and comprises an outer sleeve 77 secured to the tractor 11 by means of a bracket 78. A shaft 79 is journalled within the sleeve 77 and carries the clutch lever 50 at one end and a lever arm 80 at the other end, the arm 80 being connected to the clutch 43 by means of a link 81 as will be described in more detail in connection with Fig. 6. Such conventional clutch control mechanism is modified for the purposes of this invention by adding a bracket lever 82 freely journalled around the outside of sleeve 77 and the circular attachment portion of lever 80. Displacement of bracket 82 longitudinally of the sleeve 77 in one direction is prevented by the stop 83 welded to the sleeve and in the other direction by the radially extending portion of lever 80.

A cylinder and piston unit or fluid motor, indicated generally at 85, has the piston rod 86 thereof pivotally connected to one end of the bracket 82, and a tension spring 88 is secured to the bracket between the piston rod connection and the lever arm 80. The end of bracket 82 opposite the end which is connected to piston rod 86 has an inverted L-shape, providing a lip 90 which forms a one-way connection with the lever 80. In Fig. 4 the parts are shown in the position in which the clutch is disengaged, the clutch engaging position being indicated for lever 50 in dotted lines. Thus it will be seen that when fluid under pressure is admitted to the bottom of the cylinder 92, the cylinder and piston unit 85 are expanded so that piston rod 86 rotates bracket 82 to force lip 90 downwardly against lever 80, thus throwing the clutch lever 50 into the disengaged position shown by solid lines in Fig. 4.

In Fig. 6 a diagrammatic showning is made of the interrelation between the various elements of the ejector stop mechanism of this invention. A source of fluid under pressure 96 is connected by means of conduit 98 with valve 72, and the valve 72 is connected to the lower end of cylinder 92 by means of a conduit 100. Valve 72 comprises a cylindrical body 101 encasing a sliding valve member 102 having an axial groove 103 to provide communication between conduits 98 and 100 when the valve member is in one position. In addition, groove 103 provides communication between conduit 100 and a relief port 104 when valve member 102 is in another position. When valve member 102 is moved to the right or open position as shown in Fig. 6, it uncovers the ends of both of the conduits 98 and 100, and fluid under pressure in the source 96 has free communication through conduit 98, valve groove 103, and conduit 100 into the cylinder 92. Opening movement of the valve is accomplished when the actuating abutment 74 engages the operating lever 105 and moves it toward the right to the position shown by solid lines in Fig. 6. When the abutment 74 has been returned to the left out of engagement with the lever 105, spring 106 causes the lever 105 to move to the position shown in dotted lines in Fig. 6. As the lever 105 is moved to the dotted position, the valve member 102 moves to the left to closed position covering the end of the conduit 98 and connecting the end of conduit 100 to the relief port 104 by way of groove 103. Operating lever 105 is connected to the valve member 102 by a rod 107 slidingly received in the left end of body 101 and surrounded by a sealing bellows 108. The upper end of the lever 105 is pivotally connected to a link 109 which in turn is pivotally supported on a bracket 110 secured to valve body 101. The entire valve unit 72 is attached to one of the uprights 68 by means of the brackets 111.

The actuating cylinder 92 contains a piston 116 which is always positioned above the inlet from conduit 100 and is connected to the piston rod 86. Cylinder 92 has a breather port 120 which provides a permanent communication between the atmosphere and the inside of cylinder 92 above the piston 116. The lower end of cylinder 92 is pivotally secured at 118 to a bracket structure 122 which is attached to the tractor 11. The lower end of spring 88 is also secured to the bracket structure 122.

As shown diagrammatically in Fig. 6, the transmission system for the cable drum 41 includes a power takeoff shaft 124 from the tractor engine. A small gear 126 is connected to the end of shaft 124 and meshes with a larger gear 128 which drives the clutch 43. The clutch includes a driving plate 130 mounted for rotation with gear 128 and a driven plate 132 which is movable into and out of engagement with plate 130. Plate 132 is secured to an axially movable shaft 134. A drive sprocket 135 is also mounted on shaft 134 for rotation thereby and through which shaft 134 is free to slide by means of the key-way 136. Sprocket 135 is drivingly connected to drum 41 by means of the sprocket chain 48 and a sprocket 137 secured to the drum. Axial movement of shaft 134 and clutch plate 132 is accomplished by the bell crank 139, of which one arm 140 engages a collar 141 attached to shaft 134. The bell crank 139 is pivotally mounted at 142 and its other arm 143 is pivotally attached to the link 81 for operation by the clutch control member 50 or the bracket lever 82.

To summarize the operation of the automatic ejector control of this invention, let it be assumed that the scraper bowl 13 is loaded with earth and the operator wishes to empty the bowl. He will then move the clutch control member 50 to the position shown dotted in Figs. 4 and 6. As shown in Fig. 6, such movement of member 50 will raise link 81 to rotate bell crank 139 clockwise and thus move clutch plate 132 to the left into engagement with the plate 130. The transmission between power take-off shaft 124 and cable drum 41 will thus be completed and the drum will be rotated to reel in cable 36. As cable 36 is wound upon drum 41, it will draw the pulley unit 32 toward the pulley unit 34 and thus move the ejector 29 forward. When the ejector reaches the maximum-desired forward position, the roller abutment 74 will engage valve lever 105 and move it to the position shown solid in Fig. 6, thus opening valve 72 and establishing communication between the fluid pressure source 96 and the cylinder 92. The fluid pressure thus admitted to the cylinder will drive piston 116 upwardly to rotate bracket lever 82 clockwise as shown in Fig. 6. Upon such clockwise movement, the lip 90 of bracket 82 will engage the lever 80 and force it downwardly to disengage clutch 43.

After the clutch has been disengaged, springs 63 as shown in Fig. 2 will return the ejector to its rearward position, freeing valve lever 105 for return to the closed dotted position under the force of spring 106. When the valve is thus closed, valve member 102 closes off the end of conduit 98, and groove 103 establishes communication between conduit 100 and valve port 104 to relieve the fluid pressure beneath piston 116. In order to hasten the relief of pressure from cylinder 92, it is desirable to include a conventional quick relief valve 145 in conduit 100 so that when the pressure in conduit 100 is initially relieved by connecting it to port 104, the valve 145 will open and help vent the fluid from beneath piston 116.

As the pressure in cylinder 92 is relieved in the preceding manner, spring 88 will collapse the cylinder and piston unit 85 and rotate bracket lever 82 counter-clockwise as viewed in Fig. 6. This rotation of lever 82 will remove the lip 90 from lever arm 80 so that the operator will be able to move the clutch lever 50 to the engaged position shown dotted in Fig. 6 whenever he desires without having to exert any force for collapsing the cylinder and piston unit 85. Although air is the preferred operating fluid for the control system shown in the drawings, it will be appreciated that an equivalent hydraulic system could also be used.

In order to facilitate an understanding of the invention, reference has been made to the embodiment thereof shown in the accompanying drawings and detailed descriptive language has been employed. It will nevertheless be understood that no limitation of the invention is thereby intended and that various changes and alterations are contemplated such as would ordinarily occur to one skilled in the art to which the invention relates.

Having thus described the invention, what is claimed as new and desired to be secured by Letters Patent is:

1. In earth working machinery having a part movable in opposite directions through a predetermined path, means including a clutch for moving said part in one direction and resilient means for retracting said part in an opposite direction, the improvement comprising a cylinder and piston unit operatively connected to said clutch to disengage same upon admission of fluid to said cylinder, conduit means connecting the cylinder of said unit to a source of fluid under pressure, a valve in said conduit having a pressure relief port therein, said valve being alternately operable to establish communication between said cylinder and either said fluid source or said relief port, and means resiliently actuating said valve to normally maintain the cylinder in communication with the relief port, valve actuating means operatively connected to said movable part and operative responsive to movement thereof in said one direction for actuating said valve to establish communication between said cylinder and the source of fluid under pressure, whereby the resulting disengagement of said clutch will permit the resilient means to retract the said movable part with consequent functioning of said resilient valve actuating means to reestablish communication between the cylinder part and said relief port.

2. The combination of claim 1, including resilient means coacting with the piston of said unit for expelling the fluid from said cylinder responsive to placing of the latter in communication with said relief port.

3. An earth moving scraper having a bowl and an ejector slidably positioned within the rear portion of said bowl, a cable operatively connected to said ejector for moving the ejector forward, means including a clutch for operating said cable, a cylinder and piston unit for controlling said clutch, conduit means connecting the cylinder part of said unit to a source of fluid under pressure, said conduit including a valve secured relative to said bowl and operable to open and close said conduit, a valve actuator secured relative to said ejector and movable therewith, said valve and valve actuator being positioned so that when said ejector is in the maximum desired forward position said actuator will engage said valve and move it to open position, said cylinder and piston unit being operatively connected to said clutch to disengage said clutch when said valve is open and fluid under pressure is admitted to the cylinder part of said cylinder and piston unit, and resilient means interconnected between said bowl and said ejector for retracting said ejector from its maximum desired forward position when said clutch is disengaged.

References Cited in the file of this patent
UNITED STATES PATENTS

| | | |
|---|---|---|
| 1,223,741 | Schwister | Apr. 24, 1917 |
| 2,376,019 | Thomas | May 15, 1945 |
| 2,383,978 | LeTourneau | Sept. 4, 1945 |
| 2,565,851 | Hyler | Aug. 28, 1951 |